(12) United States Patent
Taylor et al.

(10) Patent No.: US 11,188,548 B2
(45) Date of Patent: Nov. 30, 2021

(54) PROFILE DATA STORE AUTOMATION VIA BOTS

(71) Applicant: Microsoft Technology Licensing, LLC, Redmond, WA (US)

(72) Inventors: John Anthony Taylor, Bellevue, WA (US); Christopher Lee Mullins, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 206 days.

(21) Appl. No.: 16/247,430

(22) Filed: Jan. 14, 2019

(65) Prior Publication Data

US 2020/0226132 A1    Jul. 16, 2020

(51) Int. Cl.
*G06F 16/2458*    (2019.01)
*G06F 16/9535*    (2019.01)
*G06F 16/901*    (2019.01)

(52) U.S. Cl.
CPC ...... *G06F 16/2465* (2019.01); *G06F 16/9024* (2019.01); *G06F 16/9535* (2019.01)

(58) Field of Classification Search
CPC ............. G06F 16/2465; G06F 16/9535; G06F 16/9024
USPC ........................................................ 707/776
See application file for complete search history.

(56) References Cited

U.S. PATENT DOCUMENTS

| | | |
|---|---|---|
| 9,947,319 B1 | 4/2018 | Horling et al. |
| 9,996,532 B2 | 6/2018 | Sarikaya et al. |
| 2013/0275848 A1* | 10/2013 | Neagu ............ G06F 9/451 715/223 |
| 2014/0279050 A1 | 9/2014 | Makar et al. |
| 2017/0288942 A1 | 10/2017 | Plumb et al. |
| 2018/0052884 A1* | 2/2018 | Kale ............... G06N 5/04 |
| 2018/0090137 A1 | 3/2018 | Horling et al. |
| 2018/0090141 A1 | 3/2018 | Periorellis et al. |
| 2018/0225365 A1* | 8/2018 | Altaf ............. G06F 16/334 |
| 2018/0345489 A1* | 12/2018 | Allen, IV ......... G05B 19/0421 |

(Continued)

OTHER PUBLICATIONS

Clark, Jason A., et al., "Building a Better Book in the Browser (Using Semantic Web technologies and HTML5)", The Code4Lib Journal, Issue 29, Jul. 15, 2015, pp. 1-10.*

(Continued)

*Primary Examiner* — Robert Stevens
(74) *Attorney, Agent, or Firm* — Schwegman Lundberg & Woessner, P.A.

(57) ABSTRACT

A system and method of automating data profile updating and querying includes building bots using standard schema having predefined data types for collecting data relating to a user or object. A bot stores the collected data in a data profile for the user or object in a graph data store that is queried by that bot or another bot to extract data relating to the user or object. The data relating to the user or object may be collected from two or more data channels including, for example, a channel of spoken data and a channel of typed data. The collected data is selectively processed by a bot to establish context for the collected data and is inserted into a knowledge graph that may be joined to another knowledge graph for querying. The bots automate the collection and sharing of collected profile data with other bots in an application ecosystem.

17 Claims, 5 Drawing Sheets

(56) References Cited

U.S. PATENT DOCUMENTS

2019/0306107 A1* 10/2019 Galbraith .............. G06F 9/547
2019/0370615 A1* 12/2019 Murphy ............ G06Q 10/0633

OTHER PUBLICATIONS

Kellogg, Gregg (editor), "JSON-LD 1.1—A JSON-based Serialization for Linked Data", W3C—Final Community Group Report, Jun. 7, 2018, pp. 1-111.*

Şimşek, Umutcan, et al., "Intent Generation for Goal-Oriented Dialog Systems based on Schema.org Annotations", IWC '18, Stanford, CA, Jun. 2018, 7 pages.*

Lebeuf, Carlene, et al., "Software Bots", IEEE Software, www.computer.org, © IEEESoftware, Jan./Feb. 2018, pp. 18-23.*

"Knowledge graph", Wikipedia, downloaded from: en.wikipedia.org/wiki/Knowledge_graph on Sep. 27, 2020, pp. 1-4.*

"JSON-LD", Wikipedia, downloaded from: en.wikipedia.org/wiki/JSON-LD on Sep. 27, 2020, pp. 1-4.*

Wu, Min, "Adding Structured Data in Unstructured Web Chat Conversation", UIST '12, Cambridge, MA, Oct. 7-10, 2012, pp. 75-82.*

Abbattista, et al., "Learning User Profiles for Content-Based Filtering in e-Commerce", Retrieved from: https://www.researchgate.net/publication/2530215_Learning_User_Profiles_for_Content-Based_Filtering_in_e-Commerce, Aug. 1, 2002, 12 Pages.

"International Search Report and Written Opinion Issued in PCT Application No. PCT/US2020/012103", dated Mar. 18, 2020, 11 Pages.

* cited by examiner

PROFILE DATA STORE AUTOMATION VIA BOTS

BACKGROUND

Bot services such as Azure Bot Service available from Microsoft Corporation provide tools to build, test, deploy, and manage intelligent bots. Software Development Kits made available through such bot services provide developers with tools, templates, and artificial intelligence (AI) services for the creation of bots that use speech, understand natural language, handle questions and answers, and provide other communication-based services.

Bots provide communication experiences to users that are more like dealing with a person, or at least an intelligent robot, than a computer. Bots may be used to shift simple, repetitive tasks, such as gathering profile information, to automated systems that may no longer require direct human intervention. A typical bot is an application that users interact with in a conversational way using text, interactive cards or images, or speech. Every interaction between the user and the bot generates an activity, and the associated bot service may send information between the user's bot-connected application and the bot. A channel may connect the bot to communication applications, where each bot is configured to connect to the channels on which the developer would like the bot to be available. Each channel may include additional information in the activities sent by the channel. Interaction with the bot may comprise simple questions and answers, or the interaction may be a conversation that intelligently provides access to such services.

Bots are similar to web applications that live on the internet and use application programming interfaces (APIs) to send and receive messages. Bots often consist of a web server that implements a conversational interface to communicate with bot builder tools that send and receive messages and events through interaction with memory storage. The bot builder tools also provide access to natural language processing and other cognitive and artificial intelligence services, as desired. Simple bots simply receive a message and echo the message back to the user, while more sophisticated bots may carry on an extended dialog with a user. Generally speaking, bots read and write files, use databases and APIs, and perform regular computational tasks. However, what makes bots unique is their use of mechanisms generally reserved for human-to-human communication to improve the user experience. Bots may be implemented in a number of consumer facing applications including, for example, virtual assistants that may or may not be personalized to customers. Bots are also made available across a broad range of conversational platforms and devices to perform a number of functions including greeting a user, collecting information, providing a service, or ordering a product.

When used to gather profile information, bots may ask users a series of questions in a specified sequence and store the responses in memory for later use. Bots may implement forms to execute steps in a particular order and to dynamically define field values, confirmations, and messages. The forms (e.g., HTML forms) may be derived from a static definition of the form type in C#, for example, or may be defined by using a JavaScript Object Notation (JSON) schema or XML schema. Other approaches include Code, a State Machine, a YAML file, and the like. A form that is defined using JSON is purely data-driven and the form can be changed (and therefore the behavior of the bot) by updating the schema. The JSON includes annotations that controls prompts, templates, and terms.

However, bots collect arbitrary user information for use in accordance with their own form-driven functionality and do not share information across bots and across platforms or permit distribution of that data for use in a general-purpose profile store that may be queried to access information for use in other dialogs. As a result, users may have to re-enter their information for each new bot interaction. Techniques are desired for enabling bots to automate the collection of profile data and to share the collected profile data with other bots.

SUMMARY

Various details for the embodiments of the inventive subject matter are provided in the accompanying drawings and in the detailed description text below.

The following description outlines an improved bot developer tool platform for designing and building bots that create a dialog system from forms stored as JSON documents in a way that scales across bots. The dialog system uses universally defined data types for dialog/form filling creation and stores the results in a user profile graph data store in a way that allows those results to be shared and re-used across either the same application or across other applications in the local application ecosystem. The profile data collected using a form is stored in the bot's profile store in a graph database where the data storage format is the same (e.g., JSON Linked Data (JSON-LD)) as the description format, allowing queries to be run in a manner that scales across bots, as a user's profile address may be used from many bots all sharing the same profile store.

In sample embodiments, the systems and methods described herein provide techniques for automating data profile updating and querying using bots. The methods include at least one bot using standard schema having predefined data types to collect data relating to a user or object and storing the collected data in a data profile for the user or object in a graph data store. The at least one bot then queries the data profile in the graph data store to extract data relating to the user or object as needed for developing user dialogs.

Implementations of the sample embodiments described herein collect and store data in the data profile using a first bot and may query the data profile using the first bot or a second bot. Also, the data profile may include user data collected with a first dialog by the first bot where the user data in the data profile is queried by a second dialog of the first bot. In the sample embodiments, the data relating to the user or object is collected from at least two channels connecting the at least one bot to communications applications including spoken data and typed data. A first communication application may provide the data relating to the user or object and a second communication application may provide an original source of the data relating to the user or object. In sample embodiments, the standard schema comprises schema following a JavaScript Object Notation-Linked Data (JSON-LD) encoding using data types available from schema.org.

In further implementations of the sample embodiments, storing the collected data comprises inserting the collected data into a knowledge graph and optionally joining the knowledge graph to another knowledge graph. In the sample embodiments, the data collected by the at least one bot may be processed to establish context for the collected data prior to inserting the collected data into the knowledge graph.

Further sample embodiments include a system for automating data profile updating and querying using bots. The system includes processing circuitry including at least one processor, a graph data store, and a memory device having instructions stored therein that when executed by the processing circuitry configure the at least one processor to implement a bot that uses standard schema having predefined data types to collect data relating to a user or object, stores the collected data in a data profile for the user or object in the graph data store, and queries the data profile in the graph data store to extract data relating to the user or object.

In implementations of the sample embodiments, the system further includes a second bot that has access to the graph data store. In such embodiments, collecting and storing data in the data profile may be performed by a first bot and querying the data profile in the graph data store may be performed by the second bot. Also, the data profile may include user data collected with a first dialog by the first bot where the user data in the data profile is queried by a second dialog of the first bot.

In further implementations of the sample embodiments, the data relating to the user or object is collected by the bot from at least two channels connecting the bot to communications applications including spoken data and typed data. In such implementations, a first communication application may provide the data relating to the user or object and a second communication application may provide an original source of the data relating to the user or object. In sample embodiments, the standard schema comprises schema following a JavaScript Object Notation-Linked Data (JSON-LD) encoding using data types available from schema.org.

In still other implementations of the sample embodiments, the bot stores the collected data in the data profile in the graph data store by inserting the collected data into a knowledge graph. The graph data store may further join the knowledge graph to another knowledge graph to form a personalized knowledge graph for the user and store the personalized knowledge graph. The bot may further process data collected by the bot to establish context for the collected data prior to inserting the collected data into the knowledge graph.

Further sample embodiments include a non-transitory machine-readable medium is provided having instructions stored thereon that when executed by one or more processors cause the one or more processors to implement a method of automating data profile updating and querying using bots. The method implemented by processing the instructions includes at least one bot using standard schema having predefined data types to collect data relating to a user or object, the at least one bot storing the collected data in a data profile for the user or object in a graph data store, and the at least one bot querying the data profile in the graph data store to extract data relating to the user or object. The instructions may further include instructions to cause the one or more processors to process data collected by the at least one bot to establish context for the collected data, insert the collected data into a knowledge graph, and join the knowledge graph to another knowledge graph for the user.

As discussed herein, the logic, commands, or instructions that implement aspects of the methods described herein be provided in a computing system including any number of form factors for the computing system such as desktop or notebook personal computers, mobile devices such as tablets, netbooks, and smartphones, client terminals and server-hosted machine instances, and the like. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described herein, or other aspects depicted in the accompanying drawings and detailed description below. Such systems and computer-readable media including instructions for implementing the methods described herein also constitute sample embodiments.

This summary section is provided to introduce aspects of the inventive subject matter in a simplified form, with further explanation of the inventive subject matter following in the text of the detailed description. The particular combination and order of elements listed this summary section is not intended to provide limitation to the elements of the claimed subject matter. Rather, it will be understood that the following section provides summarized examples of some of the embodiments described in the Detailed Description below.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

Figure 1:
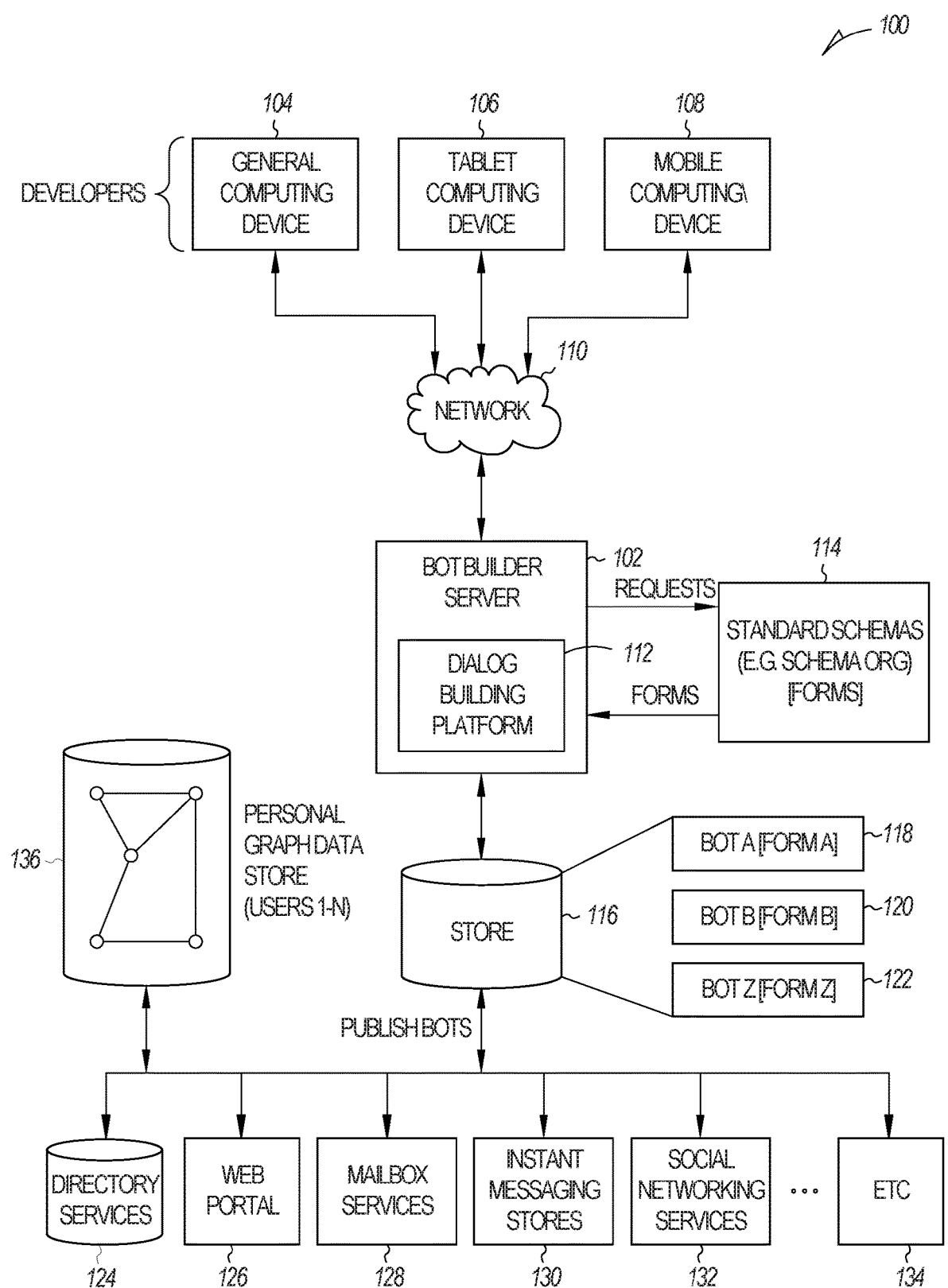
FIG. 1 illustrates a simplified block diagram of a computing system including a bot building server platform for designing and publishing bots in a sample embodiment.

The following description with respect to FIGS. 1-5 sufficiently illustrates specific embodiments to enable those skilled in the art to practice them. Other embodiments may incorporate structural, logical, process, and other changes. Portions and features of some embodiments may be included in, or substituted for, those of other embodiments. Embodiments set forth in the claims encompass all available equivalents of those claims. The example embodiments are presented for illustrative purposes only and are not intended to be restrictive or limiting on the scope of the disclosure or the claims presented herein.

The functions described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, or other computer system, turning such computer system into a specifically programmed machine.

As used herein, dialogs are a central concept in software development kits for bots and provide a useful way to manage conversations with users. Dialogs are structures in the bots that act like functions in the bot's program where each dialog is designed to perform a specific task in a specific order. The order of individual dialogs may be specified by a form to guide conversations with users. The dialogs are invoked in different ways. Sometimes the dialogs are invoked in response to a user. Sometimes the dialogs are invoked in response to some outside stimuli or from other dialogs. A dialog library may be used to provide features such as prompts and waterfall dialogs to make the bot's conversation easier to manage. Prompts are used to ask for different types of information such as text, a number, or a date. Waterfall dialogs combine multiple steps together in a predefined sequence to allow the bot to follow the predefined sequence and to pass information along to the next step.

A bot implementing dialogs is inherently stateless. A different instance of a bot may handle any given turn of a conversation. As used herein, a turn consists of the user's incoming activity to the bot and any activity the bot sends back to the user as an immediate response. Some bots can either operate without additional information or the information required is guaranteed to be within the incoming message. For other bots, state (such as where the bot is in a conversation with a user or what data has been previously received about the user) is necessary for the bot to have a useful conversation. Dialogs thus may rely on persisted states across multiple turns in the dialog where each dialog turn may represent a different state. Without state in the dialogs, the bot would not know where it is in a dialog set or what information has already been gathered, thus making meaningful conversations difficult.

For example, if a bot has talked with a user previously, it is desirable to save previous information about that user in a profile so that the same information need not be asked for again. State enables data to be maintained for longer than the current dialog turn so that the bot may keep information over the course of a multi-turn conversation. However, such information is generally not shared over different dialog sessions by the same bot and is not shared with other bots. It would be helpful if the dialog system could further permit the collected information and states to be shared not only by the same bot at different times but also across bots in an application ecosystem whereby a bot could remember context across conversations and channels and can use stored information across different dialogs.

It is further desired that the bots use a third party shared schema that permits each bot to query its own data for use in a general-purpose profile data store or use static information instead of dynamic information during a dialog. Sample third party schema may be obtained, for example, from publicly available sources such as http://schema.org (hereinafter "schema.org"), which promotes schemas for structured content on the Internet. The listed vocabularies in schema.org cover entities, relationships between entities, and actions and are developed by an open community process. Sample schemas on schema.org come in different types associated with defined common data types arranged in a hierarchy. Sample types include creative works, embedded non-text objects, events, health and medical types, organizations, persons, places, local business, product, offer, review, action, and the like, as well as a number of extensions. Schema.org vocabulary can be used with many different encodings including JSON Linked Data (JSON-LD). In turn, the JSON-LD files may be stored in a database, such as the Cosmos-DB available from Microsoft Corporation, as a resource description framework (RDF) graph that allows the stored files to be shared and queried at a later time by the same bot or by another bot adapted to use the same sample schema. The graph may also be used in a conventional fashion for forms generation.

The platform for designing and building bots as described herein provides a common data format for describing a form that needs to be filled out for a dialog and enables the re-use of a customer's previous answer by the same or a different bot or other application in the local application ecosystem. In sample embodiments, a dialog system for a bot is described by a JSON document where the "demanded' elements in the JSON document are well known data types, such as those defined in schema.org. The bot runtime is able to create a dialog system from that document to enable people (or machines) to fill out the form. The results of that form are stored in the bot's profile store which, as noted above, may be a Cosmos-DB or another graph database (e.g., non-relational or NoSQL database) that uses graph structures for semantic queries with nodes, edges, and properties to represent and store data. The storage format is the same as the schema encoding (e.g., JSON-LD) as the description format, allowing queries to be run.

Thus, in sample embodiments, defined data types such as available on schema.org are used to create dialogs associated with various products and services, to make these dialogs available to bots, and to complete forms using the bots. The data collected by the dialogs and/or the form completion process are stored in a personal data store for the user. The stored data is shared and re-used across either the same application or other applications in the local application ecosystem. Thus, the next time the bot needs a form (or portion of the form) to be completed, the bot first checks the user's personal data store to see if the user has already filled out the form. If so, the older values are used and confirmed.

It will be appreciated by those skilled in the art that this process scales across bots as a user's address may be used as an ID from many bots all sharing the same profile store. Also, as data is collected by a bot, the personal knowledge graph becomes richer and can be used to enrich the user experience including natural language understanding in interactions with the user. The extended personal profile (e.g., standardized schema organization) also can be shared across different channels and shared by different bots. The result is a platform for creating dialogs including form-filling features to generate a scalable, reusable user profile graph data store that is searchable by one or more bots to extract data from a user's profile.

For the purposes of this description, it is assumed that the platform for designing and building bots includes a portal for a bot provisioning service for creating, selecting and provisioning autonomous software agents (bots) for sharing of the type described, for example, in U.S. Patent Application Publication No. 2017/0288942. It is also assumed that the platform for designing and building bots may implement simple dialogs or more complex dialogs of the type described, for example, by U.S. Patent Application Publication No. 2018/0090141. It is further assumed that the platform for designing and building bots may implement a dialog-state specific multi-turn contextual understanding system of the type described, for example, in U.S. Pat. No. 9,996,532. Such systems collectively provide software development toolkits that enable users to create bots having dialogs desired for particular applications and to provision those bots for the particular applications for access by customers. As noted above and further below, the dialogs in the embodiments described herein are developed using a strong common schema taken from, for example, schema.org and implemented in a known schema encoding such as JSON-LD.

FIG. 1 is a simplified block diagram of a computing system 100 including a bot building server platform 102 for designing and publishing bots in a sample embodiment. As illustrated in FIG. 1, developers may user their computing devices, such as general computing device 104, tablet computing device 106, and/or mobile computing device 108, to access the bot building server platform 102 via network 110, which may be the Internet, a local network, a wide area network, and the like. Bot building server platform 102 includes resources of the type described in U.S. Patent Application Publication No. 2017/0288942 and U.S. Patent Application Publication No. 2018/0090141 to enable the developers to build bots for different communications applications. In sample embodiments, the bot building server platform 102 includes dialog building platform 112 for creating dialogs for respective applications implementing the created bot. In sample embodiments, the dialog building platform 112 uses forms received from standard schema storage 114. The standard schema storage 114 may be a service such as that provided by schema.org that includes standard schema for different user applications. The standard schema may be provided to the bot building server platform 102 or the bot building server platform 102 may make requests over network 110 to access the desired standard schema from standard schema storage 114. The standard schema is returned to the bot building server platform 102 as forms in a schema encoding such as JSON-LD.

The dialog building platform server 102 provides the forms to dialog building platform 112 to create the desired dialogs for the bots being created by the developers using techniques such as those described in U.S. Patent Application Publication No. 2018/0090141. The created bots are stored in memory store 116 for publishing to different bot channels. For example, bot A (118) implementing a dialog derived from form A, bot B (120) implementing a dialog derived from form B, a bot Z (122) implementing a dialog derived from form Z, and the like, are stored in store 116. The bots 118, 120, 122, and the like are published for access by respective bot channels including, for example, directory services 124, web portal 126, mailbox services 128, instant message stores 130, social networking services 132, and other services 134 that may implement dialogs via bots. By way of example, the dialog building platform 112 may be implemented in a general computing device, and the bot building platform server 102 is configured to implement the dialog building platform 112 via the network 110 as illustrated in FIG. 1.

Content provided by users when interacting with the respective published bots 118. 120, and/or 122 may be stored in personal graph data store 136 in the personal data graphs of the user that provided the content via any one of the different bot channels. A user ID or object ID is provided via the bot channel with the user's response content to determine in which graph the user's response content elicited by the dialog is to he stored. In sample embodiments, the data relating to the user or object may he collected from at least two data channels including a channel of spoken data and a channel of typed data. Responsive data relating to a user or object may be provided via a first channel while an original source of the data relating to the user or object may he provided via a second channel. For example, the data relating to the user or object may include an address while the original source may include an audio snippet of a user telling a bot his/her address. The personal graph data store 136 stores the responsive data into a knowledge graph having the appropriate user ID or object ID. The knowledge graph may also be joined to another knowledge graph as appropriate to expand the knowledge graph associated with a given user or object. In some examples, the bot 118, 120, or 122 may further include software for processing the data collected by the bot's dialog to establish context for the collected data prior to inserting the collected data into the appropriate knowledge graph.

In sample embodiments, forms are provided by standard schema storage 114 in response to requests demanding schema.org data types. In the following example, the demanded standard schema relates to obtaining information relating to the title and actors of a movie.

```
'''json
{
    "@context" : "http://botframework.com/forms",
    "@type" : "form"
    "demand:" : [{
        "@context" : "http://schema.org",
        "@type" : "movie",
        "required" : [
            "title"
        ]
    }, {
        "@context" : "http://schema.org",
        "@type" : "actor",
        "required" : [
            "name"
        ]
    }
    ]
}
'''
```

A forms engine of the dialog building platform 112 ingests a JSON-LD document including the demanded schema and builds a set of prompts and insures that the required fields are completed. Optional fields, as defined in schema.org terms, also may be completed.

The personal graph data store stores information received in response to dialogs as JSON-LD documents in the same form as the standard schema documents received from the standard schema store 114. Then, when a bot 118, 120, and/or 122 needs a particular form to be completed, the bot runtime can check the personal profile data in the personal graph data store 136 to see if the user has already filled out the form and simply inputs the form from the appropriate profile in the personal graph data store 136. In the case of compound forms, any portions such as "address" or "Credit Card" that are stored in the appropriate profile in the personal graph data store 136 also can be used. Such form filling, even partial form filling, is useful across many data collection scenarios.

The bots 118, 120, and/or 122 created by the developer guide the user through completion of the forms via different bot channels and store the collected data in a personal profile created for that user in the personal graph data store 136. In sample embodiments, the collected data is stored in a profile graph that is personalized to the user or to a particular object. The personalized profile graph is assigned the ID of the user or an object to which the data is related that may be used by the bot that collected the information or by other bots to later store additional information in the same personalized profile. This permits other bots to access the personalized profile graph to extract data to complete forms presented to the same user at later times.

Figure 2:
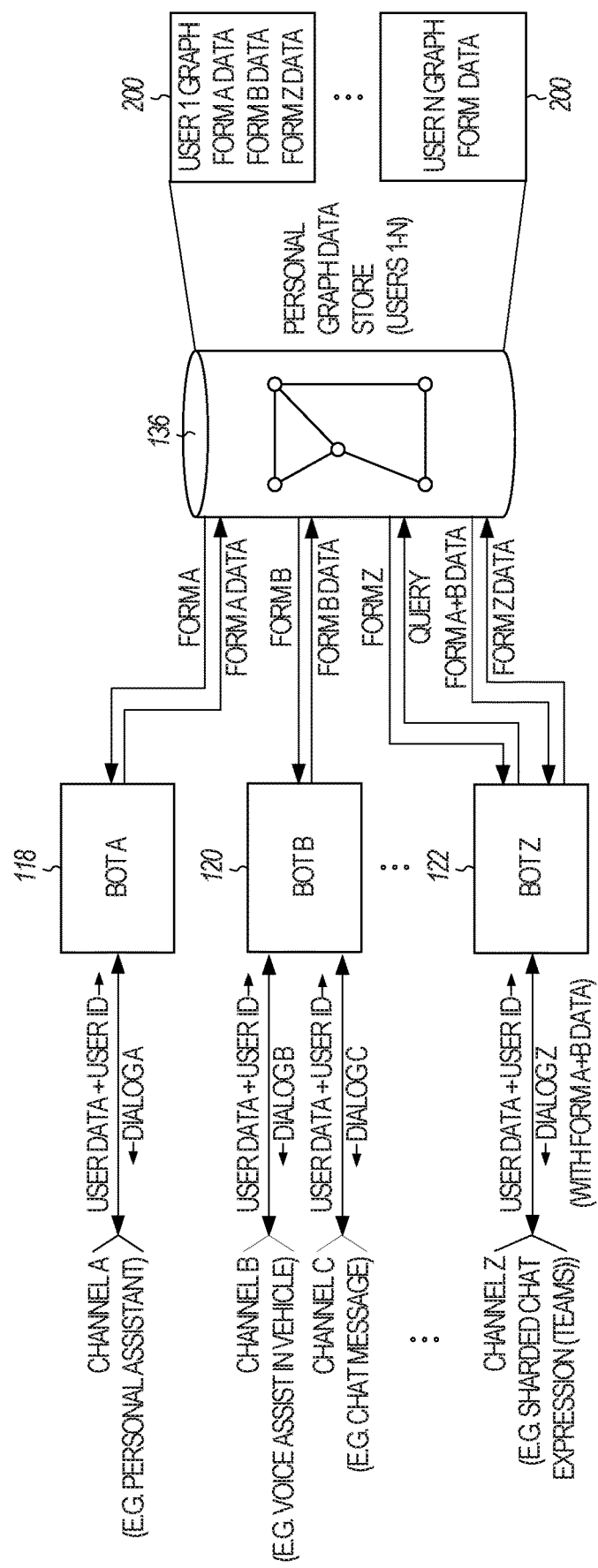
FIG. 2 illustrates the collection of user data using bots and storage of user data in a personal graph data store in a sample embodiment.

FIG. 2 illustrates the collection of user data using bots and storage of user data in a personal graph data store in a sample embodiment. In the example of FIG. 2, the personal graph data store 136 includes a number of personalized data graphs 200 for respective users or objects. Since the content is stored in graph form in a standard data type and is linked to a user ID or object ID, the respective bots 118, 120, and 122 may selectively query the personal graph data store 136 to populate dialogs with data from the user and/or object profiles stored in the personal graph data store 136. Thus, in the embodiment of FIG. 2, the personalized data graphs 200 include user data that is queried by one or more of the bots 118, 120, and 122.

In the example of FIG. 2, the dialogs from the respective bots are provided to users via a number of bot channels. For example, bot A (118) includes a dialog A derived from form A that is provided via Channel A to, for example, a personal assistant, such as Cortana® available from Microsoft Corporation. User data collected by the personal assistant in response to dialog A is provided with the user ID to the bot A (118) to add to the personal graph defined by the user ID in personal graph data store 136. Similarly, bot B (120) includes a dialog B derived from form B that is provided via Channel B to, for example, a voice assistant in a vehicle, and via Channel C to, for example, a chat messaging device. User data collected by the voice assistant and the chat messaging device in response to dialog B is provided with the respective user IDs to the bot B (120) to add to the respective personal graphs defined by the user IDs in personal graph data store 136. Bot Z (122) similarly includes a dialog Z derived from form Z that is provided via Channel Z to, for example, collaboration software such as Microsoft Teams™. In this example, dialog Z may include data from forms A and B that it obtains by querying the personal graph data store 136. Dialog Z may include the data from forms A and B in dialog Z for use in eliciting further response data in the form of sharded chat expressions from the users in Channel Z. The collected user data and the corresponding user ID in response to dialog Z is provided with the user ID to the bot Z (122) to add to the personal graph defined by the corresponding user ID in personal graph data store 136. In this fashion, the bot Z uses data collected by bots A and B to provide a dialog from bot Z to users in a completely different bot channel.

Figure 3:
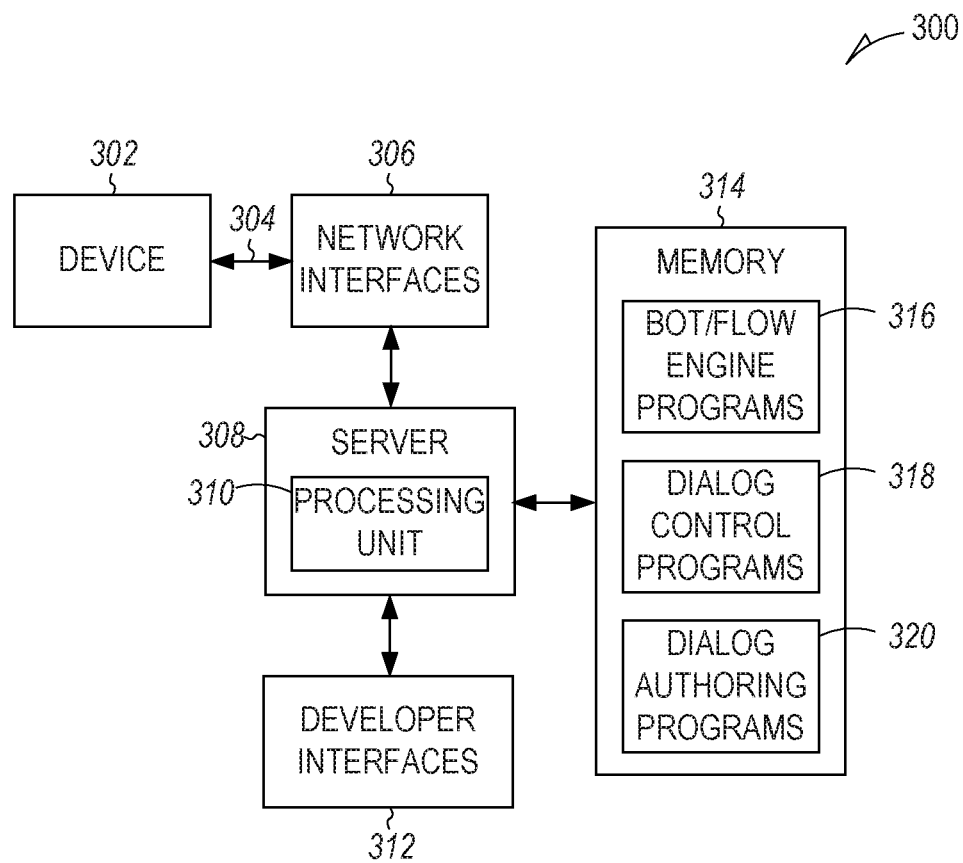
FIG. 3 illustrates a simplified block diagram of a sample apparatus for implementing bots generated in accordance with a sample embodiment.

FIG. 3 illustrates a simplified block diagram of a sample apparatus 300 for implementing bots generated in a sample embodiment. The functions described herein may be implemented on an apparatus such as apparatus 300. Apparatus 300 may be implemented to communicate over a network, such as the Internet, with devices 302 to provide conversational input and output to users of the devices 302. For example, apparatus 300 may be implemented to communicate with devices 302 used to access the respective services illustrated in FIG. 1 and FIG. 2.

In sample embodiments, apparatus 300 may include a server 308 having processing unit 310, a memory 314, network interfaces 306 to other networks, and developer interfaces 312. The network interfaces 306 allow communication between apparatus 300 and device 302 through, for example, the Internet and a wireless system in which device 302 is operating. The network interfaces 306 also allow apparatus 300 to communicate with other systems used in implementations such as language processing programs. On the other hand, developer interfaces 312 allow a developer/dialog author to configure/install one or more bots on apparatus 300. The authoring of the dialogs may be done remotely or at apparatus 300.

Memory 314 may be implemented as any type of computer readable storage media, including non-volatile and volatile memory. Memory 314 is shown as including bot flow engine control programs 316, dialog control programs 318, and dialog authoring programs 320. Server 308 and processing unit 310 may comprise one or more processors, or other control circuitry, or any combination of processors and control circuitry that provide overall control of apparatus 300 according to the disclosed embodiments.

Bot/flow engine control programs 316 and dialog control programs 318 may be executed by processing unit 310 to control apparatus 300 to perform functions for providing bot conversations using standard schema as described herein. Dialog authoring programs 320 may be executed by processing unit 310 to control apparatus 300 to perform functions that allow a user to author dialogs through the processes described herein. In alternative implementations, dialog authoring programs 320 may be implemented on another device and bots and/or dialogs may be installed on apparatus 300 once authored. Dialog control programs 318 also may be executed by processing unit 310 to control apparatus 300 to manage the dialogs presented to the bot channels during use.

Apparatus 300 is shown as including server 308 as a single server. However, server 308 may be representative of server functions or server systems provided by one or more servers or computing devices that may be co-located or geographically dispersed to implement apparatus 300. Portions of memory 314, bot/flow engine control programs 316, dialog control programs 318, and dialog authoring programs 320 may also be co-located or geographically dispersed. The term server as used in this disclosure is used generally to include any computing devices or communications equipment that may be implemented to provide bots according to the disclosed embodiments.

The example embodiments disclosed herein may be described in the general context of processor-executable code or instructions stored on memory that may comprise one or more computer readable storage media (e.g., tangible non-transitory computer-readable storage media such as memory 316). As should be readily understood, the terms "computer-readable storage media" or "non-transitory computer-readable media" include the media for storing of data., code and program instructions, such as memory 316, and do not include portions of the media for storing transitory propagated or modulated data communication signals.

Figure 4:
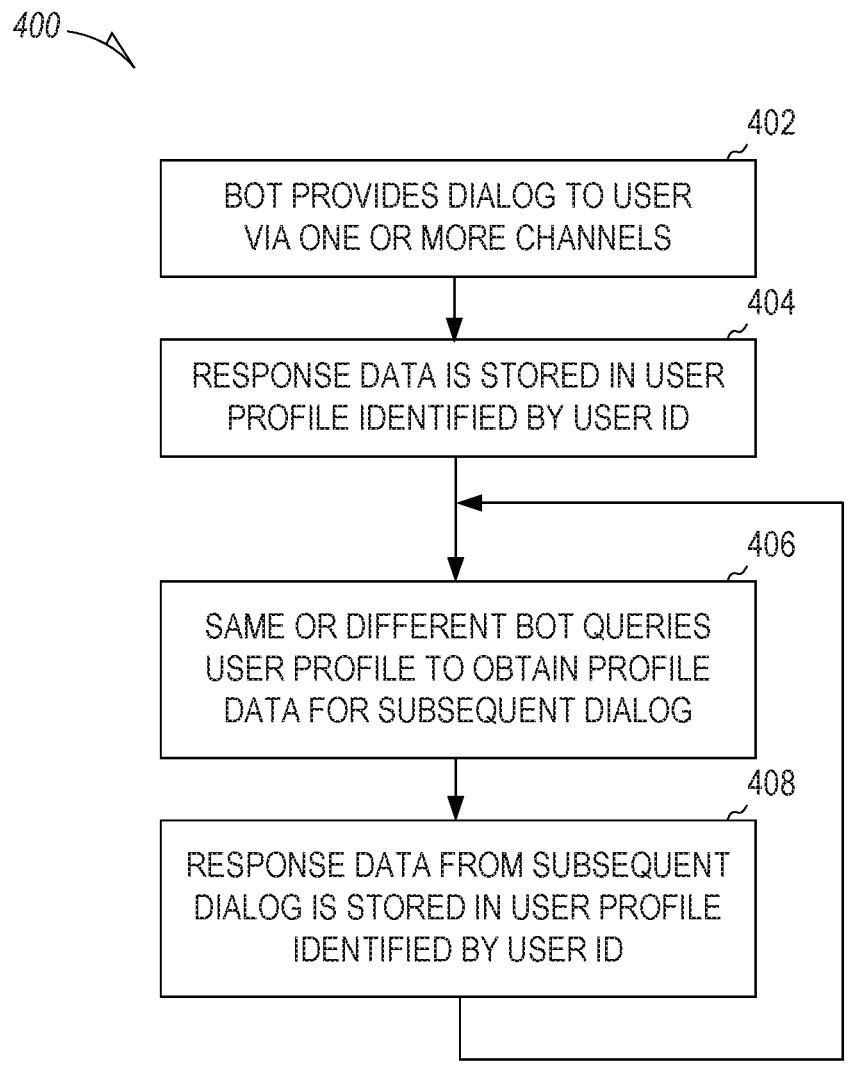
FIG. 4 illustrates a method for automating data profile updating and querying using bots in a sample embodiment.

FIG. 4 illustrates a method 400 for automating data profile updating and querying using bots to complete forms, generate user profiles, and share user profile data for automation using bots in a sample embodiment. In general, the method 400 of FIG. 4 shows the full cycle of identifying the needed data when a bot is created, creating a dialog mechanism to get that data from the user, storing that data in a profile for access by one or more bots, re-using that data as needed, and sharing that data with other applications in the application ecosystem. As illustrated in FIG. 4, a bot created using, for example, the bot builder platform server 102 described with respect to FIG. 1 provides its dialog to a user via one or more bot channels (402) and the user response data in the form of an audio response, typed response, and the like, is returned to the bot (404) for storage in the personalized data graph 200 of the personal graph data store 136 identified by a user ID returned with the data, thereby updating the user profile. If no user profile exists for that user, a new user profile is created, and the response data is inserted into a personalized data graph 200 including the new user profile in the personal graph data store 136. At a later time, the same or a different bot may query the user profile to obtain user profile data for use in a subsequent dialog at 406. The response data to that subsequent dialog is similarly returned to the bot for storage in the user profile of the personal graph data store 136 identified by a user ID returned with the data, again updating the user profile (408). This process repeats for other bots within the application ecosystem. As appropriate, knowledge graphs are joined to enhance the data collection as more information from a user is collected.

In a simple example, a first bot may ask the user via a personal assistant What type of pizza the user prefers. The user's response ("pepperoni") is returned to the bot and stored in the user's profile in the personal graph data store 136. Then, at a later time, the user may order a pizza via the user's voice assist system in the user's vehicle. A different bot may respond by asking the user if the user would like to order a pepperoni pizza, as "pepperoni" is stored in the user's profile. If the user responded with a "yes," then a pepperoni pizza would be ordered via the bot. If the user responded with a "no," then the dialog would guide the user through the process of ordering a different type of pizza. Over time, the bots would update the user's profile with preferences that may be pulled into dialogs to provide conversational responses that more closely track typical human to human information exchanges.

In other simple examples, each bot may collect authentication data as required by respective bot channels and the authentication data is stored in the user profile. At a later time, the user may be authenticated by a bot by providing different authentication data stored in the user's profile, without having to change the dialog for that bot.

Each bot may incorporate natural language understanding and voice features into the dialog messaging using, for example, a dialog-state specific multi-turn contextual understanding system of the type described, for example, in U.S. Pat. No. 9,996,532. Also, to establish user intent, the bots may be designed to call other services to provide natural language processing using machine learning techniques to identify responses that are most statistically similar when a particular response is ambiguous. Similarly, the bots may process the responses by calling, for example, a language understanding service such as LUIS to establish the intent and/or context of the user's response. In other embodiments, the natural language processing and/or language understanding service may be implemented in the bot. Such processing may be performed on the response data prior to storage in the personal profile for the responding user.

In summary, the bot developer tool platform described herein enables developers to design and build bots that create a dialog system from forms stored as JSON documents in a way that scales across bots. The dialog system uses defined data types for dialog/form filling creation and stores the results in a user profile graph data store in a way that allows those results to be shared and re-used across either the same application or across other applications in the local application ecosystem. The profile data collected using a form is stored in the bot's profile store in a graph database where the data storage format is the same (e.g., JSON Linked Data (JSON-LD)) as the description format, allowing queries to be run in a manner that scales across bots, as a user's profile address may be used by many bots all sharing the same profile store.

System Configuration

Techniques described herein may be used with one or more of the computer systems described herein and/or with one or more other systems. For example, the various procedures described herein may be implemented with hardware or software, or a combination of both. For example, the processor, memory, storage, output device(s), input device (s), and/or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs). Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

Figure 5:
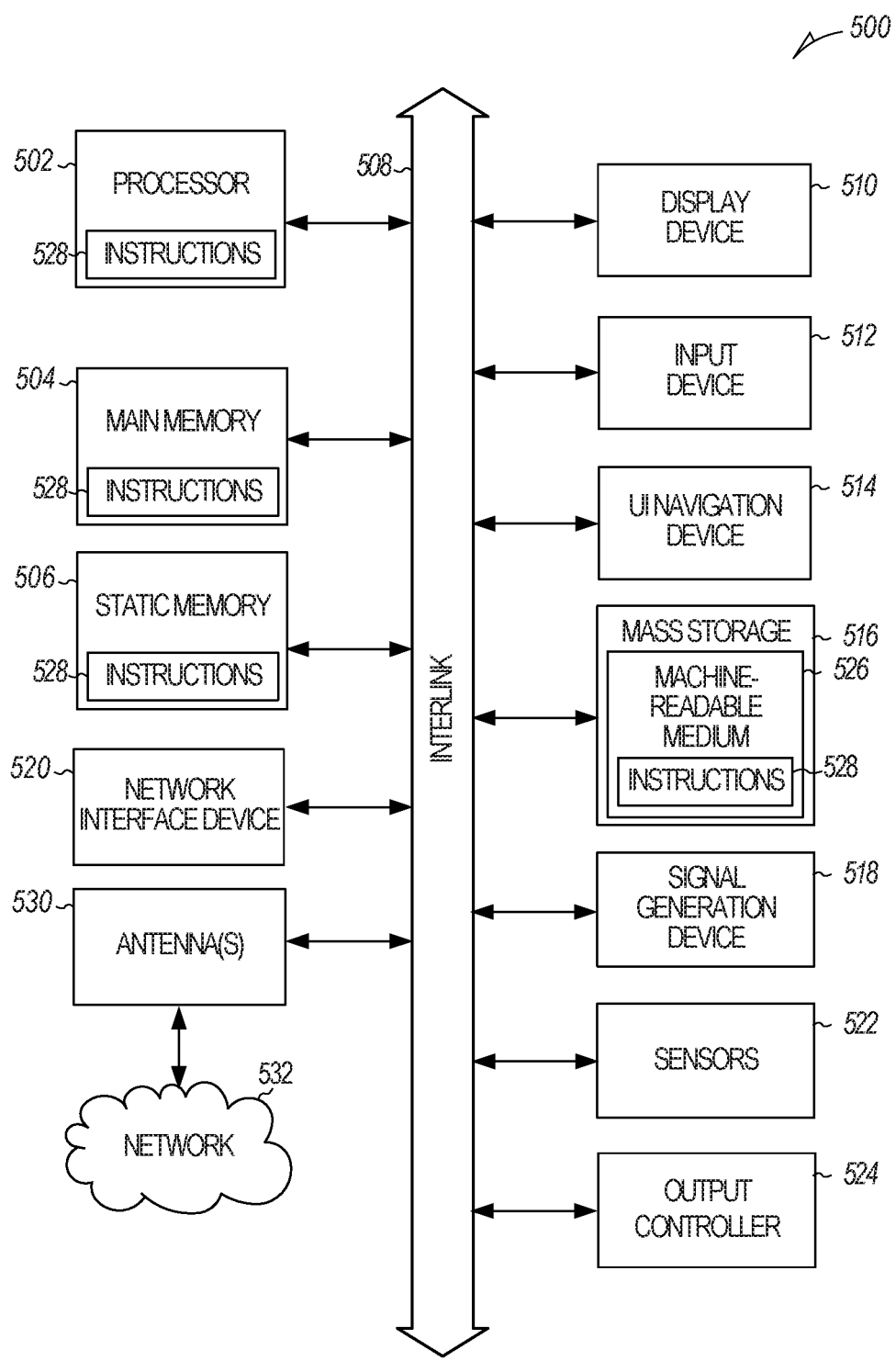
FIG. 5 illustrates a block diagram of an example of a machine upon which one or more embodiments may be implemented.

FIG. 5 illustrates a block diagram of an example of a machine 500 upon which one or more embodiments may be implemented. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. In sample embodiments, the machine 500 as well as the user devices 302 (FIG. 3) may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 500 may serve as a workstation, a front-end server, or a back-end server of a communication system. Machine 500 may implement the methods described herein by running the software used to implement the bots created as described herein. Further, while only a single machine 500 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations, Accordingly, the term "module" is understood to encompass a tangible hardware and/or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510 (shown as a video display), an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a mass storage device (e.g., drive unit) 516, a signal generation device 518 (e.g., a speaker), a network interface device 520, and one or more sensors 522. Example sensors 522 include one or more of a global positioning system (GPS) sensor, compass, accelerometer, temperature, light, camera, video camera, sensors of physical states or positions, pressure sensors, fingerprint sensors, retina scanners, or other sensors. The machine 500 may include an output controller 524, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.

The mass storage device 516 may include a machine readable medium 526 on which is stored one or more sets of data structures or instructions 528 (e.g., software) embodying or utilized by any one or more of the techniques or functions described herein. The instructions 528 may also reside, completely or at least partially, within the main memory 504, within static memory 506, or within the hardware processor 502 during execution thereof by the machine 500. In an example, one or any combination of the hardware processor 502, the main memory 504, the static memory 506 or the mass storage device 516 may constitute machine readable media.

While the machine readable medium 526 is illustrated as a single medium, the term "machine readable medium" may include a single medium or multiple media a centralized or distributed database, and/or associated caches and servers) configured to store the one or more instructions 528. The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 528 may further be transmitted or received over communications network 532 using a transmission medium via the network interface device 520. The machine 500 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.), Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) family of standards, a Universal Mobile Telecommunications System (UMTS) family of standards, peer-to-peer (P2P) networks, among others in an example, the network interface device 520 may include one or more physical jacks (e.g., Ethernet, coaxial, or phone jacks) or one or more antennas 530 to connect to the communications network 532. In an example, the network interface device 520 may include a plurality of antennas 530 to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques.

Certain embodiments are described herein as numbered examples 1, 2, 3, etc. These numbered examples are provided as examples only and do not limit the subject technology.

Example 1 is a computer-implemented method of automating data profile updating and querying using bots comprising at least one bot using standard schema having predefined data types to collect data relating to a user or object, the at least one bot storing the collected data in a data profile for the user or object in a graph data store, and the at least one bot querying the data profile in the graph data store to extract data relating to the user or object.

Example 2 is a method as in Example 1 wherein collecting and storing data in the data profile is performed by a first bot and querying the data profile is performed by a second bot.

Example 3 is a method as in any preceding example wherein the data relating to the user or object is collected from at least two channels connecting the at least one bot to communications applications including spoken data and typed data.

Example 4 is a method as in any preceding example wherein a first communication application provides the data relating to the user or object and a second communication application provides an original source of the data relating to the user or object.

Example 5 is a method as in any preceding example wherein the standard schema comprises schema following a JavaScript Object Notation-Linked Data (JSON-LD) encoding using data types available from schema.org.

Example 6 is a method as in any preceding example wherein storing the collected data comprises inserting the collected data into a knowledge graph.

Example 7 is a method as in any preceding example further comprising joining the knowledge graph to another knowledge graph.

Example 8 is a method as in any preceding example further comprising processing data collected by the at least one bot to establish context for the collected data prior to inserting the collected data into the knowledge graph.

Example 9 is a method as in any preceding example wherein the data profile includes user data collected with a first dialog by a first bot and the user data in the data profile is queried by a second dialog of the first bot.

Example 10 is a system for automating data profile updating and querying using bots comprising processing circuitry including at least one processor, a graph data store, and a memory device having instructions stored therein, wherein the instructions, which when executed by the processing circuitry, configure the at least one processor to implement a bot that uses standard schema having predefined data types to collect data relating to a user or object, stores the collected data in a data profile for the user or object in the graph data store, and queries the data profile in the graph data store to extract data relating to the user or object.

Example 11 is a system as in Example 10 further comprising a second bot that has access to the graph data store, wherein collecting and storing data in the data profile is performed by the bot and querying the data profile in the graph data store is performed by the second bot.

Example 12 is a system as in Examples 10 or 11 wherein the data relating to the user or object is collected by the bot from at least two channels connecting the bot to communications applications including spoken data and typed data.

Example 13 is a system as in Examples 10 to 12 wherein a first communication application provides the data relating to the user or object and a second communication application provides an original source of the data relating to the user or object.

Example 14 is a system as in Examples 10 to 13 wherein the generic schema comprises schema following a JavaScript Object Notation Linked Data (JSON-LD) encoding using data types available from schema.org.

Example 15 is a system as in Examples 10 to 14 wherein the bot stores the collected data in the data profile in the graph data store by inserting the collected data into a knowledge graph.

Example 16 is a system as in Examples 10 to 15 wherein the graph data store joins the knowledge graph to another knowledge graph to form a personalized knowledge graph for the user and stores the personalized knowledge graph.

Example 17 is a system as in Examples 10 to 16 wherein the bot further processes data collected by the bot to establish context for the collected data prior to inserting the collected data into the knowledge graph.

Example 18 is a system as in Examples 10 to 17 wherein the data profile includes user data collected with a first dialog by the bot and the user data in the data profile is queried by a second dialog of the bot.

Example 19 is a non-transitory machine-readable medium having instructions stored thereon that when executed by one or more processors cause the one or more processors to implement a method of automating data profile updating and querying using bots, the method including at least one bot using standard schema having predefined data types to collect data relating to a user or object, the at least one bot storing the collected data in a data profile for the user or object in a graph data store, and the at least one bot querying the data profile in the graph data store to extract data relating to the user or object.

Example 20 is a medium as in Example 19, wherein the instructions include instructions to cause the one or more processors to process data collected by the at least one bot to establish context for the collected data, insert the collected data into a knowledge graph, and join the knowledge graph to another knowledge graph for the user.

Alternative implementations of the system for automating data profile updating and querying using bots described herein are contemplated. For example, the system for automating data profile updating and querying using bots described herein may be implemented within or in association with a number of online products and services besides a bot building platform. Such additional online products and services include, for example, a digital assistant application, a voice recognition application, an email application, a social networking application, a collaboration application, an enterprise management application, a messaging application, a word processing application, a spreadsheet application, a database application, a presentation application, a contacts application, a gaining application, an e-commerce application, an e-business application, a transaction application, a device control application, a web interface application, an exchange application, a calendaring application, a chat application, a voice assist application, and the like. Thus, the system for automating data profile updating and querying using bots described herein is not to be limited to the system described in specific examples. These and other implementations are included within the context of the disclosed embodiments as set forth in the following claims.

In the above Detailed Description, various features may be grouped together to streamline the disclosure. However, the claims may not set forth every feature disclosed herein as embodiments may feature a subset of the features. Further, embodiments may include fewer features than those disclosed in a particular example. Also, although the subject matter has been described in language specific to structural features and/or methodological acts, it is to be understood that the subject matter defined in the appended claims is not necessarily limited to the specific embodiments, features, or acts described above. Rather, the specific embodiments, features, and acts described above are disclosed as example forms of implementing the claims. Thus, the following claims are hereby incorporated into the Detailed Description, with a claim standing on its own as a separate embodiment.

What is claimed is:

1. A method of automating data profile updating and querying using bots that implement one or more dialogs, comprising:
at least one first bot for completing a first form in a first storage format, the at least one bot collecting data relating to a user or object during a first dialog session using a standard schema having predefined data types;
the at least one first bot storing the collected data in a data profile in the first storage format for the user or object in a graph data store in accordance with the standard schema; and
at least one second bot querying the data profile in the graph data store in a second dialog session to extract data relating to the user or object and to complete a second form.

2. The method of claim 1, further comprising collecting the data relating to the user or object from at least two channels connecting the at least one first bot to communications applications including spoken data and typed data.

3. The method of claim 2, wherein collecting the data relating to the user or object comprises a first communication application providing the data relating to the user or object and a second communication application providing an original source of the data relating to the user or object.

4. The method of claim 3, wherein the standard schema comprises schema following a JavaScript Object Notation-Linked Data (JSON-LD) encoding using data types available from schema.org.

5. The method of claim 1, wherein storing the collected data comprises inserting the collected data into a knowledge graph.

6. The method of claim 5, further comprising joining the knowledge graph to another knowledge graph.

7. The method of claim 5, further comprising processing data collected by the at least one first bot to establish context for the collected data prior to inserting the collected data into the knowledge graph.

8. A system for automating data profile updating and querying using bots that implement one or more dialogs, comprising:
processing circuitry including at least one processor;
a graph data store; and
a memory device having instructions stored therein, wherein the instructions, which when executed by the processing circuitry, configure the at least one processor to implement a first bot that:
collects data relating to a user or object during a first dialog session using a standard schema having predefined data types wherein the first bot is configured to collect the data to complete a first form defined by the predefined data types;
stores the collected data in a data profile for the user or object in the graph data store in accordance with the standard schema; and
queries the data profile in the graph data store in a second dialog session to extract data relating to the user or object to complete a second form different from the first form, the second form being defined by the predefined data types.

9. A system as in claim 8, further comprising a second bot that has access to the graph data store, the second bot querying the data profile in the graph data store for filling out a third form defined by the predefined data types.

10. A system as in claim 8, wherein the data relating to the user or object is collected by the first bot from at least two channels connecting the first bot to communications applications including spoken data and typed data.

11. A system as in claim 10, further comprising a first communication application that provides the data relating to the user or object and a second communication application that provides an original source of the data relating to the user or object.

12. A system as in claim 11, wherein the standard schema comprises schema following a JavaScript Object Notation-Linked Data (JSON-LD) encoding using data types available from schema.org.

13. A system as in claim 8, wherein the first bot stores the collected data in the data profile in the graph data store by inserting the collected data into a knowledge graph.

14. A system as in claim 13, wherein the graph data store joins the knowledge graph to another knowledge graph to form a personalized knowledge graph for the user and stores the personalized knowledge graph.

15. A system as in claim 13, wherein the first bot further processes data collected by the first bot to establish context for the collected data prior to inserting the collected data into the knowledge graph.

16. A non-transitory machine-readable medium having instructions stored thereon that when executed by one or more processors cause the one or more processors to implement a method of automating data profile updating and querying using bots that implement one or more dialogs, the method including:
at least one first bot for completing a first form in a first storage format, the at least one bot collecting data relating to a user or object during a first dialog session using a standard schema having predefined data types;
the at least one first bot storing the collected data in a data profile in the first storage format for the user or object in a graph data store in accordance with the standard schema; and
at least one second bot querying the data profile in the graph data store in a second dialog session to extract data relating to the user or object and to complete a second form.

17. A medium as in claim 16, wherein the instructions include instructions to cause the one or more processors to process data collected by the at least one first bot to establish context for the collected data, insert the collected data into a knowledge graph, and join the knowledge graph to another knowledge graph for the user.

* * * * *